(12) United States Patent
Proksa

(10) Patent No.: US 12,471,874 B2
(45) Date of Patent: Nov. 18, 2025

(54) CONTROLLER FOR A CT SCANNER

(71) Applicant: KONINKLIJKE PHILIPS N.V., Eindhoven (NL)

(72) Inventor: Roland Proksa, Neu Wulmstorf (DE)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 217 days.

(21) Appl. No.: 18/025,145

(22) PCT Filed: Sep. 7, 2021

(86) PCT No.: PCT/EP2021/074535
§ 371 (c)(1),
(2) Date: Mar. 7, 2023

(87) PCT Pub. No.: WO2022/053441
PCT Pub. Date: Mar. 17, 2022

(65) Prior Publication Data
US 2023/0320687 A1 Oct. 12, 2023

(30) Foreign Application Priority Data
Sep. 9, 2020 (EP) ..................... 20195179

(51) Int. Cl.
*A61B 6/03* (2006.01)
*A61B 6/00* (2006.01)
(52) U.S. Cl.
CPC .............. *A61B 6/545* (2013.01); *A61B 6/032* (2013.01); *A61B 6/482* (2013.01); *A61B 6/5205* (2013.01)
(58) Field of Classification Search
None
See application file for complete search history.

(56) References Cited

U.S. PATENT DOCUMENTS 6,963,631 B2    11/2005   Brunnett
7,597,476 B2 *  10/2009   Neumann ............... A61B 6/542
                                                    378/207

(Continued)

FOREIGN PATENT DOCUMENTS

EP          3453327 A1   3/2019
WO      WO2018011321 A1  1/2018

(Continued)

OTHER PUBLICATIONS

PCT International Search Report, International application No. PCT/EP2021/074535, Dec. 9, 2021.

(Continued)

*Primary Examiner* — Thomas R Artman
(74) *Attorney, Agent, or Firm* — Larry Liberchuk

(57) ABSTRACT

A controller and method are for configuring operation of a kVp-switching spectral CT imaging apparatus which, in at least one mode, aims to mimic the user-side operating workflow of a conventional non-spectral CT scanner. The controller receives user-defined settings associated with operation of a non-spectral CT system, comprising a desired peak tube voltage and desired tube current. Based on these user-specified inputs, the controller performs a conversion procedure to derive a set of spectral CT operating parameters which are estimated to result in administration of the same dose of X-ray radiation over a single kVp switching cycle as would be administered by the conventional scanner over a same time duration. Thus, the user can acquire CT projection and image data using a spectral CT scanner, without a need to change their own operating workflow, and furthermore in a way that will administer the same radiographic density as they would expect to achieve with the same user-specified settings on a conventional scanner.

12 Claims, 4 Drawing Sheets

(56) References Cited

U.S. PATENT DOCUMENTS

| | | | |
|---|---|---|---|
| 8,515,147 B2 | 8/2013 | Baeumer | |
| 9,324,142 B2 | 4/2016 | Shechter | |
| 10,004,816 B2* | 6/2018 | Newton | A61B 6/032 |
| 10,213,167 B2* | 2/2019 | Bippus | A61B 6/481 |
| 10,219,771 B2* | 3/2019 | Jung | A61B 6/545 |
| 10,973,489 B2* | 4/2021 | Rupcich | H05G 1/30 |
| 11,000,238 B2* | 5/2021 | Proksa | A61B 6/032 |
| 11,191,514 B2* | 12/2021 | Boutry | A61B 6/542 |
| 12,106,405 B2* | 10/2024 | Koehler | G06T 11/005 |
| 2004/0081279 A1* | 4/2004 | Brunnett | A61B 6/4021 |
| | | | 378/98.8 |
| 2009/0119028 A1* | 5/2009 | Neumann | A61B 17/2256 |
| | | | 702/33 |
| 2014/0056503 A1* | 2/2014 | Shechter | G06T 11/005 |
| | | | 382/131 |
| 2015/0190533 A1* | 7/2015 | Newton | A61B 6/481 |
| | | | 600/431 |
| 2016/0100816 A1* | 4/2016 | Jung | A61B 6/4464 |
| | | | 378/97 |
| 2017/0181714 A1 | 6/2017 | Bippus | |
| 2019/0099148 A1* | 4/2019 | Rupcich | H05G 1/265 |
| 2020/0397387 A1* | 12/2020 | Proksa | A61B 6/032 |
| 2020/0406061 A1 | 12/2020 | McKnight | |
| 2021/0121151 A1* | 4/2021 | Boutry | A61B 6/5282 |
| 2021/0272338 A1 | 9/2021 | Koehler | |
| 2023/0320687 A1* | 10/2023 | Proksa | A61B 6/545 |
| | | | 378/4 |

FOREIGN PATENT DOCUMENTS

| | | |
|---|---|---|
| WO | WO2020002174 A1 | 1/2020 |
| WO | WO2020002174 A9 | 1/2020 |
| WO | WO2020025403 A1 | 2/2020 |

OTHER PUBLICATIONS

Alvarez R.E. et al., "Energy-Selective Reconstructions in X-Ray Computerized Tomography", Physics in Medicine & Biology, vol. 21, No. 5, pp. 733-744, 1976.

* cited by examiner

CONTROLLER FOR A CT SCANNER

FIELD OF THE INVENTION

This invention relates to a controller for a CT imaging apparatus, in particular for a kVp switching CT imaging apparatus.

BACKGROUND OF THE INVENTION

A computed tomography (CT) scanner includes an X-ray radiation generator mounted on a rotatable gantry opposite one or more detectors. The X-ray generator rotates around an examination region located between the X-ray generator and the one or more detectors and emits (typically polychromatic) radiation that traverses the examination region and a subject and/or object disposed in the examination region. The one or more detectors detect radiation that traverses the examination region and generate a signal (or projection data) indicative of the examination region and the subject and/or object disposed therein. The projection data refers to the raw detector data, and can be used to form a projection sinogram, the latter being a visual representation of the projection data captured by the detector(s).

Within the field of CT imaging technology, two varieties of CT imaging can be distinguished: spectral CT imaging and non-spectral CT imaging.

A non-spectral computed tomography (CT) scanner generally includes an x-ray tube mounted on the rotatable gantry opposite one or more rows of detectors. The X-ray tube rotates around the examination region and emits broadband radiation that traverses the examination region. A key parameter is the peak kilovoltage (kVp), which is the maximum voltage applied across the X-ray tube during generation of X-rays.

For example, with a peak (maximum) tube voltage of 120 keV (i.e. 120 kVp), the energy spectrum of the emitted radiation (with filtering of low energy photons) may be from 40 keV to 120 keV. The one or more rows of detectors detect radiation that traverses the examination region and generate projection data (line integrals) indicative thereof. The projection data is reconstructed to generate volumetric image data.

The voxels of the reconstructed volumetric image data are typically displayed using gray scale values corresponding to relative radiodensity. The gray scale values reflect the attenuation characteristics of the scanned subject and generally show structure such as anatomical structures within the scanned subject. Since the attenuation of a photon by a material is dependent on the energy of the photon traversing the material, the detected radiation also includes spectral information, which provides additional information indicative of the elemental or material composition (e.g., atomic number) of the scanned material of the subject. However, the values of the projection data are proportional to the energy fluence integrated over the energy spectrum (e.g., 40 keV to 120 keV), and the volumetric image data does not reflect the energy dependent information.

A spectral (multi-energy) CT scanner is configured to generate projection data at multiple different spectra. Multiple measurements with different spectra enable obtaining information about the energy dependent attenuation of the X-ray. This is known as spectral X-ray imaging. Spectral X-ray data allows for discerning and quantifying materials comprised by the scanned object.

One of the methods for performing spectral imaging is kVp switching, in which a tube voltage is cyclically switched between or through at least two different tube voltages. A single X-ray tube may be switched through different operating peak voltages, or two or more X-ray tubes may be used, configured to emit radiation having different mean spectra, and sequentially driven.

By way of example, in a dual-energy configuration, a first voltage (e.g., a lower kVp) is applied across the X-ray tube voltage for a first integration period, a second voltage (e.g., a higher kVp) is applied across the X-ray tube voltage for a second integration period, the first voltage is applied across the X-ray tube voltage for a third integration period, the second voltage is applied across the X-ray tube voltage for a fourth integration period, and so on.

The lower and higher kV projection data can be decomposed, e.g., into photoelectric effect and Compton scattering components, which may then be individually reconstructed and then combined to produce virtual monoenergetic volumetric image data.

The operation of kVp switching CT scanners is more complex than operation of conventional non-spectral CT scanners. Thus, operators who have experience operating only conventional scanners may find use of spectral CT scanners difficult and unfamiliar. It may be more difficult for such practitioners to apply their experience and expertise in operating CT scanners in an intuitive way, which may lead to poorer quality images, longer times for performing scans, and potentially errors in configuring the scanner settings, which may expose patients to the radiation of a scan without resulting in useable images. Thus, ultimately clinical outcomes for patients risk being diminished.

SUMMARY OF THE INVENTION

It has been recognized by the inventors that it would be desirable to have a means for enabling an operator who has experience operating a conventional non-spectral CT scanner to apply their operational capabilities directly to operation of a spectral CT-scanner.

It has further been recognized that it would be desirable for an operator to be able to acquire spectral CT scan data, and the additional information this can provide, even without detailed expertise on configuring the operating parameters for spectral CT scanning.

The invention is defined by the claims.

According to examples in accordance with an aspect of the invention, there is provided a controller for use in controlling operation of a spectral computed tomography (CT) X-ray imaging apparatus.

The imaging apparatus is a kVp-switching apparatus comprising an X-ray generator having at least one X-ray tube, and the generator controlled during operation to switch cyclically between at least two different X-ray tube voltages (this representing a kVp switching cycle), for acquiring spectral CT scan data. The apparatus has a set of first adjustable operating parameters.

The apparatus is selectively operable in a secondary (pseudo-conventional) acquisition mode in which the controller is adapted to: receive a user input indicative of user-defined settings for a set of second operating parameters, wherein the second operating parameters are parameters associated with operation of non-spectral CT imaging, comprising use of a radiation source operated with a fixed x-ray tube voltage. The second operating parameters include at least a value of the fixed tube voltage, kVp, and a tube current, I.

The controller is adapted to apply a conversion procedure for converting the user-defined settings for the second operating parameters into a set of values for the first operating parameters which are determined to result in delivery of a same estimated X-ray radiation dose over a single kVp switching cycle (time) period as would be delivered by a fixed-voltage radiation source, operated with the user-defined second operating parameters, over the same time period.

The controller is further adapted to generate control instructions for causing the spectral X-ray imaging apparatus to perform a CT scanning procedure in accordance with the determined settings for the first operating parameters, and thereby obtain a set of spectral CT scan data. The scan data may be spectral projection data. This may be further processed to derive image data or other information as will be explained later.

Thus embodiments of the invention enable a user to input the operating parameters that they would use for a conventional (non-spectral) CT scanner, and wherein the scanner converts these to an equivalent set of parameters for the spectral CT scanner which aims to match the X-ray dosage that would be generated with the conventional settings. This allows a user to directly perform a CT scan with a spectral CT scanner even if they have only knowledge for operating non-spectral scanners. Furthermore, by calculating the spectral CT parameters so that they result in a same X-ray dose as the user would expect from the conventional scan, the resulting scan data will result in reconstructed image data with similar visual properties in terms of radiographic density.

For example, in a conventional scan, the tube voltage and current are used to balance the expected image quality (in terms of contrast and noise) against the patient radiation dose and an operator is trained to follow the ALARA (As Low As Reasonably Achievable) principle for the X-ray dose. Thus the combination of tube voltage and current in a conventional scan impacts the patient dose and the image appearance.

In preferred embodiments, the first operating parameters determined by the controller may include at least an upper tube voltage, and lower tube voltage. This means that the controller, when applying the conversion procedure for converting the user-defined settings for the second operating parameters into a set of values for the first operating parameters, is adapted to determine values for at least an upper (maximum) tube voltage and a lower (minimum) tube voltage of the kVp switching scan protocol in dependence upon the user-input set of second operating parameters. These are free parameters in the fitting process. Thus the method involves at least adjusting the upper and lower voltage bounds of the kVp switching protocol to identify (first) operating parameters of the scanner which provide the same dose as the user-defined second operating parameters.

Upper and lower tube voltages refer to the maximum and minimum tube voltages of the set of two or more tube voltages that the generator is adapted to switch cyclically between during operation.

In some embodiments, the first operating parameters may additionally or alternatively include a tube current. The value of the tube current may in some cases be freely adjustable as a function of time over one or a plurality of kVp switching cycles. For example, the conversion process may involve fitting the tube current waveform so as to meet the required dose characteristics. The upper and lower voltage bounds may also be freely adjustable as a function of time in this way, so that they are dynamically adjusted over a plurality of switching cycles. In further cases, the first operating parameters may include a mean tube current.

In some embodiments, the first operating parameters may additionally or alternatively include a duty cycle of the kVp switching protocol, i.e. the ratio of the lower to higher voltage period (durations), and/or a frequency of switching.

The controller may be a single control unit or may be a control arrangement comprising a plurality of control modules or processors. It may be a processing arrangement for example.

The spectral CT scan data may correspond to spectral projection data for example, or spectral imaging data in some examples.

In accordance with one or more embodiments, the controller may be adapted to generate virtual non-spectral image data based on processing of the obtained spectral CT scan data, and based on the user-defined fixed tube voltage.

The tube voltage in a conventional scan determines the radiographic contrast of the resulting reconstructed images. In some embodiments, the controller may be configured to construct, from the obtained spectral CT projection data, image data which mimics the appearance of a non-spectral image which would be acquired from a conventional CT scanner using the user-defined operating parameters.

This achieves the technical effect that the image output presented to the user is constructed to replicate the appearance of scan image data generated by the convention CT scanner apparatus.

In accordance with one or more embodiments, the controller may be adapted to:
  determine a time period, T, of a single kVp switching cycle of the spectral CT apparatus;
  calculate an estimated X-ray dose which would be delivered by a fixed-voltage radiation source, operated with the user-defined settings for the second operating parameters over a time period equal to said determined time period, T; and
  determine settings for the first operating parameters which, when implemented on the spectral CT scanning apparatus, are estimated to result in delivery of an X-ray dose over each kVp switching cycle period equal to said estimated X-ray dose.

The estimated X-ray dose means the X-ray dose that would be delivered by a non-spectral CT scanning apparatus if configured with the user-defined settings for the second operating parameters.

In some examples, the calculating may be based on a pre-defined equation or lookup table.

There are different possible definitions for the X-ray dose, depending upon whether it is defined as energy per unit mass, energy per unit area, or various other definitions. In all cases, it relates to a total amount of radiation energy delivered over a certain period.

In one advantageous set of examples, it is defined as the total beam energy per radiated unit of mass (abbreviated as 'Kerma').

The definition of dose may be user-configurable in some examples, for instance based on a user input provided at a user-interface.

In accordance with one or more embodiments, the controller may be adapted to calculate the total beam energy per radiated unit of mass for the fixed-voltage radiation source $K_{conv}$ based on the equation:

$$K_{conv} = T\int_o^\infty dE P(E, U_{conv}, I_{conv})E$$

where P(E, U, I) is the estimated spectrum of the X-ray beam of the fixed-voltage radiation source entering the scanned subject (possibly after passing through any beam forming elements or materials for example), where E is the radiation energy, U is the X-ray tube voltage, I is the X-ray tube current, and T is the time duration of a single switching cycle of the spectral imaging apparatus.

In some examples, the controller may be adapted to calculate the spectrum of said beam that enters the subject based on the equation:

$$P(E,U,I) = X(E,U,I)e^{-\Sigma_{i \in f} \mu(i,E) l(i)}$$

where X(E, U, I) is an assumed X-ray tube output spectrum, f is the estimated set of all materials the X-ray beam must pass through between the X-ray source and the subject (or the target depth level within the subject), μ(i,E) is the linear absorption coefficient of material i, l(i) is the thickness of each material, E is the radiation energy, U is the X-ray tube voltage, and I is the X-ray tube current.

In accordance with one or more embodiments, determining settings for the first operating parameters may comprise a fitting procedure for fitting the first operating parameters based on a target X-ray dose equal to the computed X-ray dose for the fixed voltage X-ray source.

There are a greater number of operating parameters associated with spectral CT imaging than with non-spectral imaging. Many of these scan parameters, such as rotation time, collimation etc. can be kept identical between the non-spectral and spectral CT apparatuses. However, the fixed tube voltage and current settings cannot be kept identical since the tube voltage and current change over the course of each switching cycle in the kVp switching apparatus. Thus, there is no one-to-one mapping between the non-spectral voltage and current parameters and the spectral parameters.

Thus, reconstructing spectral CT operating parameters to achieve a desired dose may advantageously be performed as an optimization problem, for example based on seeking to fit the voltage-change waveform over the course of the switching cycle such that the total delivered X-ray dose matches the target dose.

The fitting or optimization procedure may for example be based on minimizing a pre-determined cost function.

The controller may be configured, in at least one operation mode, to generate spectral image data based on the obtained spectral projection data.

In one or more embodiments, the controller may be adapted to receive a user input indicative of a desired image reconstruction mode, and, based on the user input, to selectively operate:

in a first image reconstruction mode in which only the virtual non-spectral image data is generated;
in a second image reconstruction mode in which both the virtual non-spectral image data and spectral image data is generated; or
in a third image reconstruction mode in which only the spectral image data is generated.

This therefore allows the user to selectively operative in a fully pseudo-conventional mode, or in a hybrid mode (both spectral and non-spectral image data are generated), or in a purely spectral mode.

Examples in accordance with a further aspect of the invention provide a system, comprising:

a spectral CT X-ray imaging apparatus comprising an X-ray generator having at least one X-ray tube, and the generator controlled during operation to switch cyclically between at least two different X-ray tube voltages, for generating spectral CT scan data, and the apparatus having a set of first adjustable operating parameters; and a controller in accordance with any example or embodiment outlined above or described below, or in accordance with any claim of this application, operatively coupled with the spectral CT X-ray imaging apparatus.

The system may further comprise a user interface operatively coupled with the controller, and wherein the controller is arranged to receive the user-defined settings for the set of second operating parameters from the user interface.

The system may further comprise a display unit, and wherein the controller is adapted to reconstruct volumetric image data based on the spectral CT image data and to output the volumetric image data to the display unit for presentation to a user.

Examples in accordance with a further aspect of the invention provide a method of controlling operation of a spectral computed tomography (CT) X-ray imaging apparatus.

The spectral X-ray imaging apparatus is a kVp-switching apparatus comprising an X-ray generator having at least one X-ray tube, and the generator controlled during operation to switch cyclically between at least two different X-ray tube voltages, for generating spectral CT scan data, and the apparatus having a set of first adjustable operating parameters.

The method comprises receiving a user input indicative of user-defined settings for a set of second operating parameters, wherein the second operating parameters are parameters associated with a different, non-spectral, CT imaging apparatus configured to operate with a radiation source operated with a fixed x-ray tube voltage, the second operating parameters including at least a value of the fixed tube voltage, KVp, and a tube current, I.

The method further comprises applying a conversion procedure for converting the user-defined settings for the second operating parameters into a set of values for the first operating parameters which are determined to result in delivery of a same X-ray radiation dose over a single kVp switching cycle period as would be delivered by a fixed-voltage radiation source, operated with the user-defined second operating parameters, over the same time period.

The method further comprises generating control instructions for causing the X-ray imaging apparatus to perform a CT scanning procedure in accordance with the determined settings for the first operating parameters, and thereby obtain a set of spectral CT scan data.

Examples in accordance with a further aspect of the invention provide a computer program product comprising computer program code, the computer program code being executable on a processor or computer.

When the processor or computer is operatively coupled with a spectral computed tomography (CT) X-ray imaging apparatus, the code is configured to cause the processor to perform a method in accordance with any example or embodiment outlined above or described below, or in accordance with any claim of this application.

These and other aspects of the invention will be apparent from and elucidated with reference to the embodiment(s) described hereinafter.

BRIEF DESCRIPTION OF THE DRAWINGS

For a better understanding of the invention, and to show more clearly how it may be carried into effect, reference will now be made, by way of example only, to the accompanying drawings, in which.

DETAILED DESCRIPTION OF THE EMBODIMENTS

Figure 1:
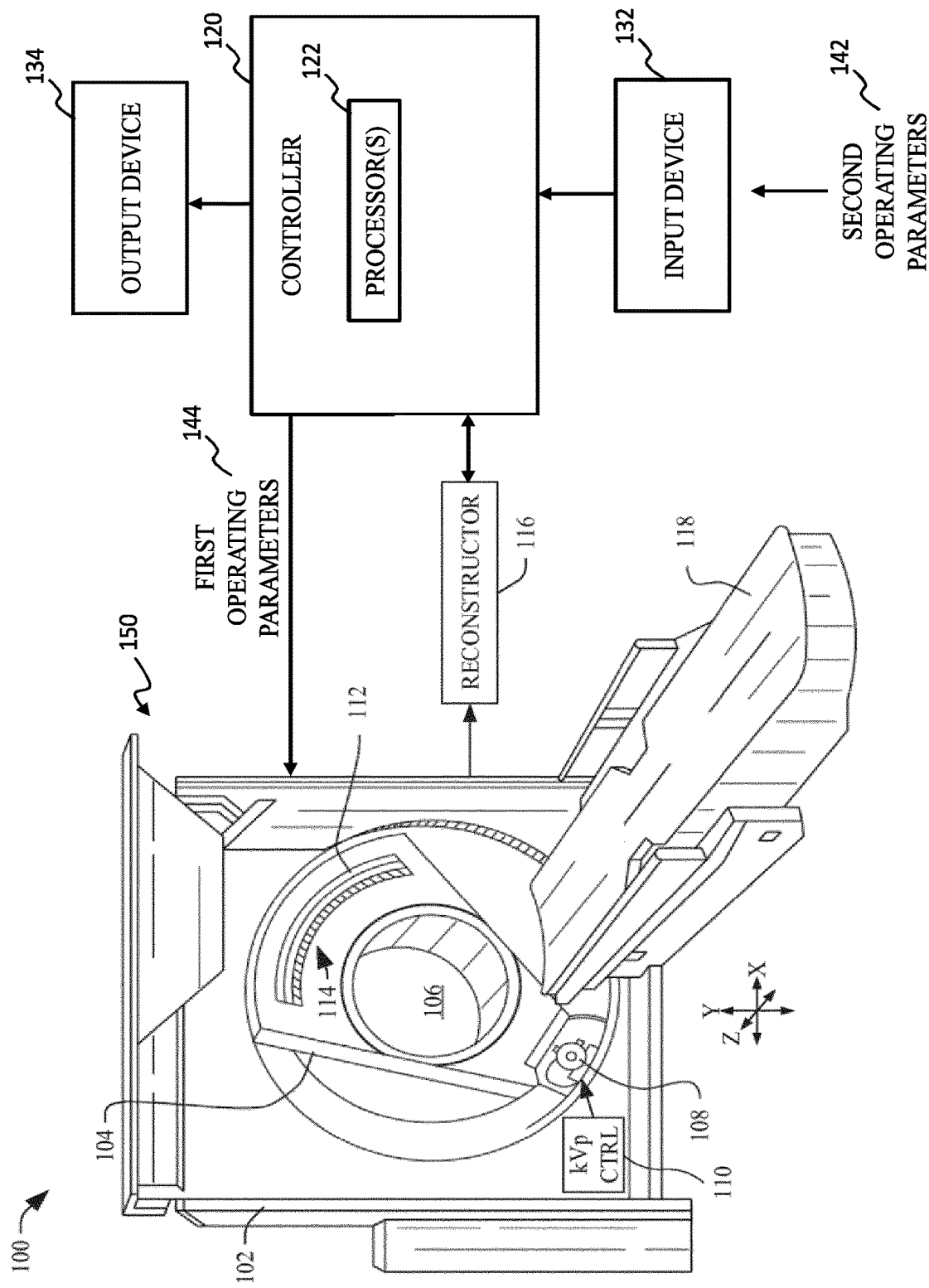
FIG. 1 schematically illustrates a CT imaging system in accordance with one or more embodiments.

The invention will be described with reference to the Figures.

It should be understood that the detailed description and specific examples, while indicating exemplary embodiments of the apparatus, systems and methods, are intended for purposes of illustration only and are not intended to limit the scope of the invention. These and other features, aspects, and advantages of the apparatus, systems and methods of the present invention will become better understood from the following description, appended claims, and accompanying drawings. It should be understood that the Figures are merely schematic and are not drawn to scale. It should also be understood that the same reference numerals are used throughout the Figures to indicate the same or similar parts.

The invention provides a controller and method for configuring operation of a kVp-switching spectral CT imaging apparatus which, in at least one mode, aims to mimic the user-side operating workflow of a conventional non-spectral CT scanner. The controller receives user-defined settings associated with operation of a non-spectral CT system, comprising a desired peak tube voltage and desired tube current. Based on these user-specified inputs, the controller performs a conversion procedure to derive a set of spectral CT operating parameters which are estimated to result in administration of the same dose of X-ray radiation over a single kVp switching cycle as would be administered by the conventional scanner over a same time duration. Thus, the user can acquire CT projection and image data using a spectral CT scanner, without a need to change their own operating workflow, and furthermore in a way that will administer the same radiographic density as they would expect to achieve with the same user-specified settings on a conventional scanner.

The following describes an example spectral CT X-ray imaging system configured for acquiring spectral projection data using kVp switching multi-energy acquisition. Initially referring to FIG. 1, an imaging system 100, such as a computed tomography (CT) scanner, is schematically illustrated. The imaging system 100 includes a scanning or imaging apparatus 150 which includes a generally stationary gantry 102 and a rotating gantry 104, which is rotatably supported by the stationary gantry 102 and rotates around an examination region 106 about a z-axis.

A radiation source 108, such as an X-ray tube, is rotatably supported by the rotating gantry 104, rotates with the rotating gantry 104, and emits broadband radiation that traverses the examination region 106. A radiation source voltage controller (kVp CTRL) 110 controls a peak emission voltage of the radiation source 108. The kVp CTRL 110 is configured to switch the X-ray tube voltage between at least two voltages (e.g., 80 kVp and 140 kVp, etc.). As a result, the radiation source 108 alternately produces at least a first radiation beam with a first energy spectrum and a second radiation beam with a second, different, energy spectrum.

It is noted that in some examples, the radiation source 108 may include a single X-ray tube configured to switch between at least two different emission voltages (e.g., 80 kVp and 140 kVp) during scanning. However, in further examples, the radiation source 108 may include two or more X-ray tubes configured to emit radiation having different mean spectra. In still further examples, the radiation source 108 may include a combination thereof.

A detector 112 includes a one- or two-dimensional array of detector elements 114, with each row extending in an x-y plane, and multiple rows arranged along the z direction. The detector 112 is rotatably supported by the rotating gantry 104 along an angular arc opposite the radiation source 108 across the examination region 106. The detector 112 rotates in coordination with the radiation source 108, detects radiation that traverses the examination region 106, and generates different sets of projection data for each of the different energy spectra.

In one instance, the kVp CTRL 110 alternates the X-ray tube voltage between integration periods (IPs). Generally, an IP is a period of time the detector 112 detects radiation while rotating through a predetermined angular increment for a measurement. For each IP, each detector element 114 produces an attenuation line integral. A set of line integrals for an IP/angular increment is a view. The projection data includes a set of views acquired over at least 180° plus a fan angle for each of the different energy spectra.

A reconstructor 116 is typically further included and reconstructs the projection data for the different energy spectrums and generates volumetric image data.

As described in greater detail below, this may include generating spectral volumetric image data and/or non-spectral volumetric image data from the (spectral) projection data. Non-limiting examples of spectral volumetric image data include low and high energy, mono-energetic/monochrome, virtual non-contrast, effective Z (atomic number), and iodine only spectral image data.

The non-spectral volumetric image data corresponds to a predetermined X-ray tube kVp. In one instance, the reconstructor 116 is implemented with a processor (e.g., a central processing unit or a microprocessor) configured to execute computer executable instructions stored, embedded or encoded on computer readable storage medium, such as physical memory and/or other non-transitory memory. In some embodiments, the reconstructor 116 includes specialized hardware such as a graphics processing unit (GPU), and/or an application specific integrated circuit (ASIC). The reconstructor 116 may be part of the system 100 and/or may be remote therefrom.

A subject support 118, such as a couch, supports an object or subject in the examination region 106. The subject support 118 is movable in coordination with performing an imaging procedure so as to guide the subject or object with respect to the examination region 106 for loading, scanning, and/or unloading the subject or object.

A controller 120 is operatively linked with the CT scanning apparatus 150. In particular, it is operatively coupled with the reconstructor 116 and with the X-ray imaging assembly, including the kVp CTRL 110 and the detector 112. The controller may comprise one or more processors 122. The reconstructor may be part of the controller in other examples.

A user interface, such as an operator console, includes an input device 132 which allows an operator to control an operation of the system 100 such as inputting operating parameters. The input device may for example include a mouse and/or keyboard. A user output device may also be included 134, such as a display monitor. This may be used to display reconstructed image data and/or may form part of an operator console for use in configuring and controlling the system.

As discussed, the X-ray imaging apparatus 150 is a kVp-switching apparatus. It has a set of first adjustable operating parameters. By way of example, these may include for example at least: upper tube voltage, lower tube voltage, mean tube current, and/or kVp duty cycle.

The controller 120 is arranged to receive, e.g. from the user input device 132, a set of user-specified second operating parameters 142. The second operating parameters are parameters associated with operation of a different, non-spectral, CT imaging apparatus, which uses a fixed radiation source (tube) voltage. For example, the input device 132 may be part of a user interface which prompts the user via a display to input values for a set of second operating parameters. The second operating parameters include at least a value of a fixed tube voltage, kVp, and a radiation tube fixed current, I.

The combination of tube voltage and current in a conventional scan impact the patient X-ray dose and the image appearance. For example, current and the voltage setting together affect the X-ray intensity as well as the applied patient dose. As a result, the image noise will also be affected (in an inverse proportional relationship).

The controller 120 is configured to compute a conversion or mapping between these user-specified second operating parameters 142 and the required first operating parameters for the spectral CT imaging system 100. In particular, the controller 120 is configured to apply a conversion procedure for converting the user-defined settings for the second operating parameters into a set of values for the first operating parameters which are determined to result in delivery of a same X-ray radiation dose over a single kVp switching cycle period as would be delivered by a fixed-voltage radiation source, operated with the user-defined second operating parameters, over the same time period.

Once the conversion has been performed, the controller is then configured to generate control instructions for causing the X-ray imaging apparatus 100 to perform a CT scanning procedure in accordance with the determined settings for the first operating parameters 144, and thereby derive a set of spectral CT scan data, e.g. projection data.

In some embodiments, the reconstructor 116 may then generate spectral image data based on the obtained spectral projection data. In some embodiments, non-spectral image data may additionally or alternatively be generated. This is described in further detail to follow.

Figure 2:
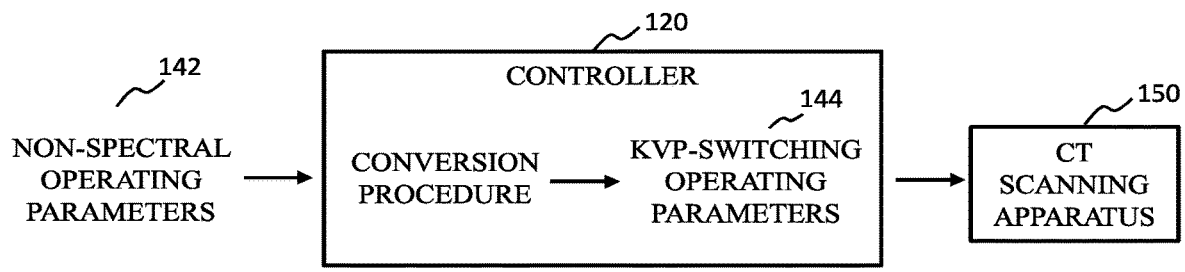
FIG. 2 schematically illustrates a processing flow for a controller according to one or more embodiments.

FIG. 2 schematically outlines the processing workflow of the controller 120. The second (non-spectral) operating parameters 142 are received at the controller. The controller applies a conversion procedure. The conversion procedure may be a set of one or more algorithms encoded in one or more processors of the controller. The algorithms in simple examples may comprise referring to one or more reference look-up tables which recite appropriate first operating parameters 144 for the spectral imaging apparatus 100 based on the input second operating parameters 142. These might be calculated in advance and pre-stored in a local datastore for instance. In other examples, the controller may apply one or more algorithms configured to calculate in real time appropriate second operating parameters 144 for the kVp switching apparatus. This may involve calculating the estimated X-ray dose associated with the user-specified second operating parameters, and deriving the first operating parameters based on seeking to match this X-ray dose.

The derived first operating parameters 144 for the kVp switching apparatus are communicated to the spectral CT imaging apparatus 100 for implementation of a CT scanning operation.

Figure 3:
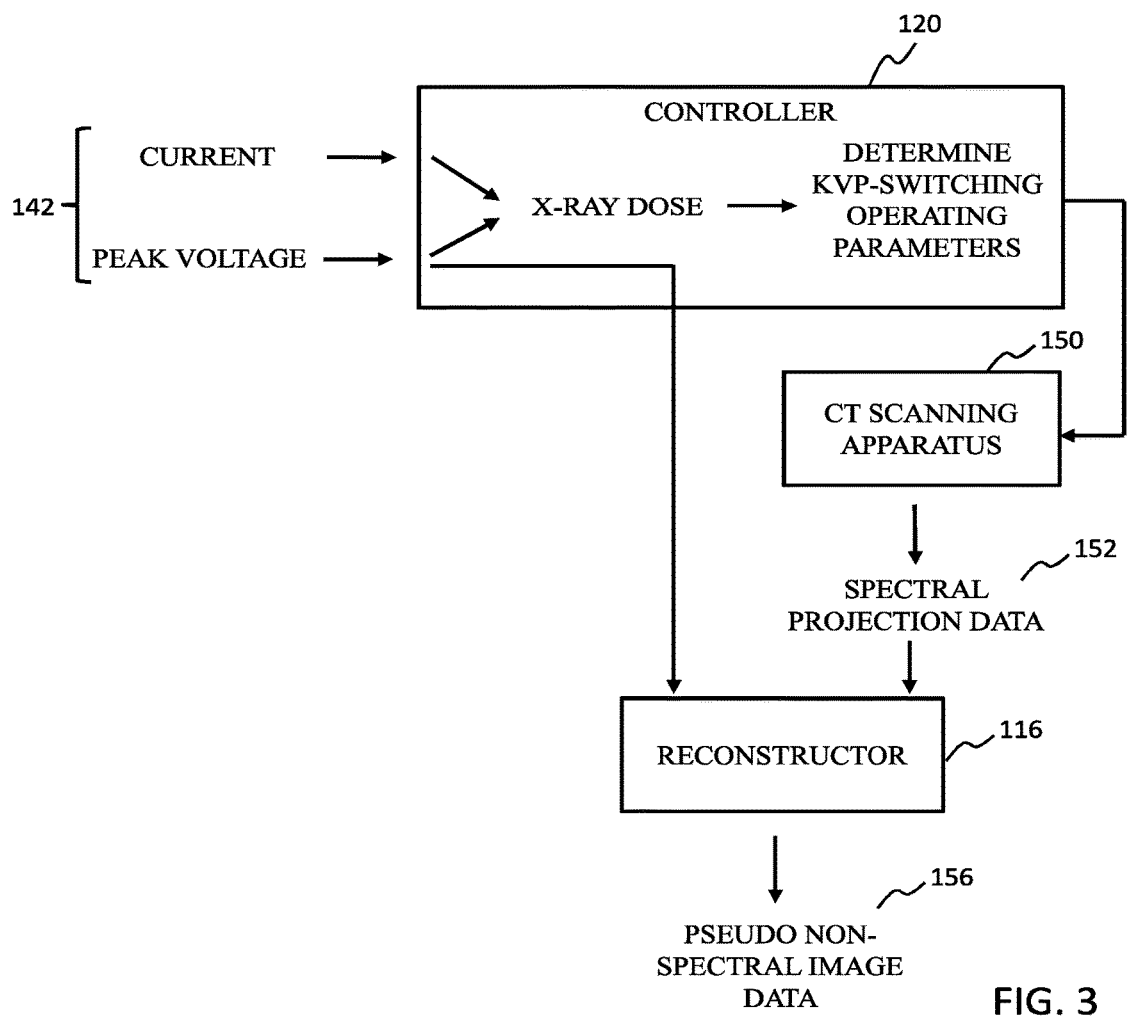
FIG. 3 further schematically illustrates a processing flow according to one or more embodiments.

The processing flow of the controller is outlined in more detail in FIG. 3. As indicated, the set of second (non-spectral) operating parameters 142 includes at least a tube current, I, and a value for the fixed tube peak voltage, kVp. These relate to parameters for the poly-energetic non-spectral CT apparatus, in which an X-ray source is operated at a single fixed tube voltage and current.

These user-specified parameters 142 are received at the controller 120.

The controller may compute an estimated X-ray dose which would be delivered by a fixed-voltage radiation source, operated with the user-defined settings for the second operating parameters 142 over a time period, T, equal to the time period of a single kVp switching period of the spectral CT imaging apparatus 100. The switching period refers to the period over which the full sequence of two or more kVp tube voltages has been switched through. The time period, T, may be known and stored in a local memory or may be calculated by the controller.

The X-ray dose may in some example be defined as the total beam energy per radiated unit of mass (abbreviated to Kerma). The Kerma can be defined for different depths within the body. For example, the Kerma at object entrance is indicative of the skin-dose. Within the object (beneath the skin) the X-ray dose may change due to different absorption characteristics. Another dose definition may use the Kerma in the center of the subject, or even a weighted sum of the skin and central dose. Another dose definition may be based on dose measures using a patient phantom and a calorimeter, these stored in advance in a lookup table, and this consulted in operation to determine an estimated dose.

The definition of dose to be used may be stored in a local datastore or memory or encoded in the programming of the controller and retrieved when performing the dose calculations. This may include a function, equation or algorithm to be applied for calculating dose, or a look-up table.

The controller determines settings for the first operating parameters which, when implemented on the spectral CT scanning apparatus 100, are estimated to result in delivery of an X-ray dose over each switching cycle period, T, equal to said estimated X-ray dose.

These determined first operating parameters are then communicated to the CT scanning apparatus 100 which implements a scanning protocol based on these settings.

The spectral CT scanning apparatus thereby obtains spectral projection data 152.

In some embodiments, a reconstructor 116 receives the spectral projection data 152 and generates reconstructed image data of the scanned subject, e.g. volumetric image data.

In advantageous examples, this comprises generating virtual non-spectral image data (or pseudo non-spectral image data) based on processing of the obtained spectral CT projection data, and based on the value of the user-defined fixed radiation source voltage.

In particular, the image appearance in a conventional CT scanner depends on the X-ray tube voltage because the CT contrast of biological tissue depends upon the X-ray spectrum. If the user selects a particular tube voltage value, he or she would expect to obtain an image having an image appearance according to the polychromatic spectrum of the selected tube voltage. Thus, the derived spectral projection data 152 may optionally be processed to obtain virtual non-spectral image data, based on the user-specified fixed voltage setting, kVp. This process will be explained in greater detail to follow.

In some embodiments, in at least one operation mode, the reconstructor 116 may additionally or alternatively generate spectral image data based on the obtained spectral projection data 152.

In some embodiments, the controller may be adapted to receive a user input indicative of a desired image reconstruction mode, and, based on the user input, to selectively operate:

in a first reconstruction mode in which only the virtual non-spectral image data is generated;

in a second reconstruction mode in which both the virtual non-spectral image data and spectral image data is generated; or in a third reconstruction mode in which only the spectral image data is generated.

It is noted that although the reconstructor 116 is shown as a separate unit from the controller 120, the reconstructor may form a part of the controller. The controller may be a distributed controller, comprising a plurality of processing modules which may or may not form a single physical unit.

As discussed above, in some embodiments, the controller 120 is configured to calculate an estimated X-ray dose which would be delivered by a fixed-voltage radiation source, operated with the user-defined settings for the second (non-spectral) operating parameters 142 over a time period of a single switching cycle. This will now be described in more detail.

As mentioned above, there may be different possible definitions of the X-ray dose. In all cases, the dose refers to an amount of X-ray energy administered to a subject during at least a portion of a CT scan. In some cases, this may be total amount of X-ray radiation over the whole subject volume. In other cases, it may be energy per unit volume or unit area. In other cases, it may be energy per unit mass. The definition may be defined in advance and stored explicitly or implicitly in the controller. In some examples, it may be user configurable, so that a user may select a preferred definition of dose for use in performing the conversion calculations.

The dose of X-ray radiation is preferably calculated for only a single kVp switching cycle of the spectral X-ray apparatus. This simplifies calculations.

For the purposes of this example, the X-ray dose will be defined as the total beam energy per radiated unit of mass (abbreviated Kerma).

The controller may be configured to first calculate an estimated X-ray dose which would be delivered by a fixed-voltage radiation source, operated with the user-defined settings for the second operating parameters over a time period, T, equal to the time period of a single kVp switching cycle.

For this, the Kerma of the central X-ray beam when entering the subject can be calculated. For a given user-defined tube voltage, U, and current, I, it is possible to calculate the central beam power by integrating the (filtered) X-ray spectrum of the X-ray tube over the energy. Filtered means the spectrum of the beam after passing through the materials forming the subject.

A tube output spectrum of X(E, U, I) is assumed, with E being the energy, U being the tube voltage and I being the tube current. A spectrum, P, of the (filtered) X-ray beam of the single-voltage radiation source entering the subject (possibly after passing through any beam forming elements or materials for example) can be estimated as:

$$P(E,U,I) = X(E,U,I) e^{-\Sigma_{i \in f} \mu(i,E) l(i)} \quad (1)$$

where f is the estimated set of all materials the X-ray beam must pass through between the X-ray source and the subject (or the target depth level within the subject), $\mu(i,E)$ is the linear absorption coefficient of material i, and $l(i)$ is the thickness of each material.

X( ) and P( ) are typically represented in units of a number of photons, per energy interval, per unit of time, per solid angle.

For the conventional (non-spectral) scan, the X-ray dose ($K_{conv}$), over a period of time equal to a switching cycle of length T, may be calculated using the following energy integration:

$$K_{conv} = T \int_0^\infty dE P(E, U_{conv}, I_{conv}) E \quad (2)$$

For the kVp-switching apparatus, calculation of the dose (Kerma) requires further integration over time, since the tube voltage and current vary over the course of a switching cycle, T. Taking U(t) and I(t) to be the voltage and current waveforms over one switching cycle, the dose ($K_{kVp-S}$) over a single switching cycle, T, for the kVp-switching apparatus may be estimated as:

$$K_{kVp-S} = \int_0^\infty dE \int_0^T dt P(E, U(t), I(t)) E \quad (3)$$

As discussed above, the controller is configured to determine settings for the first (spectral CT) operating parameters which, when implemented on the spectral CT imaging apparatus, are estimated to result in delivery of an X-ray dose over each switching cycle period equal to the estimated X-ray dose calculated for the user-input second operating parameters.

Since, the tube voltage and current vary as a function of time over a switching cycle for the spectral CT imaging apparatus, it is necessary to determine a voltage and current waveform for implementation by the spectral CT scanner which delivers the same equivalent X-ray dose of the conventional scan over a time period equal to a single switching period.

Equations (2) and (3) above provide equations for estimating dose over a switching cycle for a non-spectral and spectral CT scanner respectively according to a definition of dose as the total beam energy per radiated unit of mass (Kerma).

Estimating the first operating parameters for achieving the calculated target X-ray dose can be understood as an optimization procedure, in which the free parameters of the spectral CT apparatus are optimized to minimize deviation of the resulting dose from the target dose. The constraints for the optimization are the individual hardware constrains of the scanner apparatus and the target X-ray dose. Typically, the number of free parameters in the optimization is larger than one, as required to match the dose requirement. Therefore, an optimization goal may be defined to more narrowly constrain or guide the optimization process. A practical goal may use the estimated spectral separation power of the spectral CT scan protocol or the sensitivity to photon starvation.

The term spectral separation power refers to the quality of the obtained spectral attenuation information. If the two spectra (at the two different kVp switching voltages) are similar or have very different noise levels, the task of obtaining spectral information (often called material separation) is less stable and the material separation becomes noisy.

If the total X-ray flux within one integration period (IP) becomes very low, the number of photons detected by the detector may become very small or even zero. This effect is called photon starvation. Photon starvation will cause problems in the image reconstruction and can cause streak artifacts.

Figure 4:
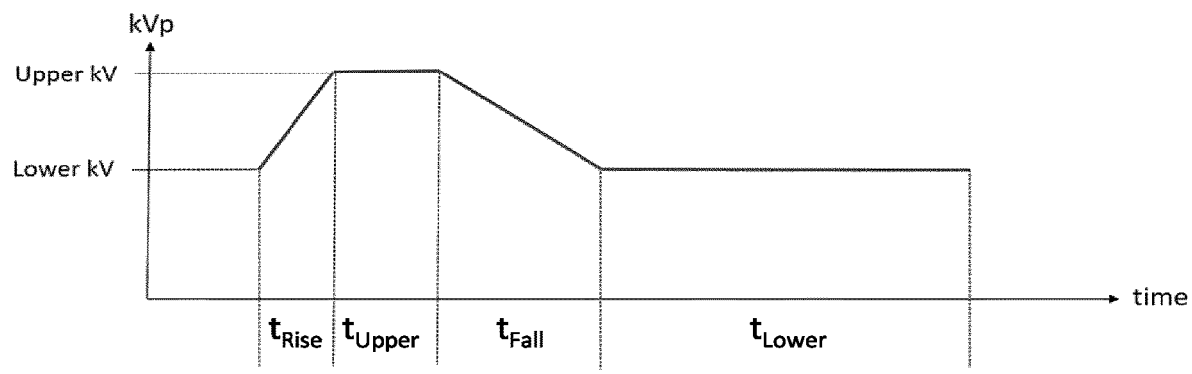
FIG. 4 illustrates a voltage waveform for a kVp switching cycle of a spectral CT imaging apparatus.

One example is now presented for one example spectral (kVp-switching) CT imaging apparatus. FIG. 4 shows a voltage waveform of for one kVp-switching cycle, of total duration, T. The total switching period, T, is composed of a higher voltage period, $t_{upper}$ during which the tube is powered at the higher voltage, a lower voltage period, $t_{lower}$ during which the tube is powered at the lower voltage, and two transition periods $t_{rise}$, $t_{fall}$ during which the voltage ramps up from the lower to the higher voltage and ramps down from the higher to the lower voltage respectively. In the illustrated examples, the switching cycle is shown beginning the ramping up transition period, $t_{rise}$, but the cycle can be understood to begin with any of the periods.

The free parameters of the optimization (the first operating parameters) in this case are the lower voltage level, the upper voltage level, and the duty cycle (the ratio of the lower to higher voltage periods). In addition, the tube current can be controlled. The durations of the transition periods are typically fixed by the CT scanner hardware and depend on the voltage levels and the current. For a tube with thermionic emission, the emitter temperature is typically controlled. Because of the relatively slow heating and cooling of the emitter, the temperature will stay almost constant during the cycle and cannot be changed. The resulting emission current will therefore follow the tube characteristics for a constant emitter temperature and the controlled tube voltage.

The effective current waveform depends on the temperature and on the voltage waveform. This dependency is assumed to be known or determined in advance and is used in the constrained optimization procedure.

The optimization can be performed based on minimizing a cost function, where the cost function defines the optimization goal, e.g. the best spectral separation power. This optimization goal is pursued within the defined constraints, which include the target X-ray dose as well as other hardware constraints such as apparatus power limits etc.

By way of non-limiting example, one exemplary optimization algorithm may be as follows:
Optimization Algorithm
Search over all but one of the CT apparatus first operating parameters:
  Calculate the dependent parameter (e.g. rise and fall time) using the system constraints and behavior.
  Calculate the remaining free parameter (e.g. duty cycle) to fulfil the dose equivalence requirements (X-ray dose matches the target dose).
  Calculate the cost function (e.g. spectral separation power).
  When the trialed set of first operating parameters exceeds the optimization constrains (e.g. power level) the cost function should be set to infinite.
Steps 1, 2, 3 can be repeated recurrently to minimize the cost function.

As noted above, there are typically more degrees of freedom of the spectral CT apparatus to match the dose constrains than required (one). From all the sets of first parameter settings that fulfill the dose requirement, only one is needed. The cost function adds a further guide to the optimization, so that a set of parameters which maximizes a certain advantageous characteristic can be achieved. By way of one example, the cost function may be configured to select for settings which achieve the best spectral separation power.

For example, and by way of non-limiting illustration, one cost function may be considered as follows for estimating the spectral separation power. For a given set of first operating parameters, it is possible to estimate the effective spectra for the low and high voltage phases of the switching cycle. A spectral imaging task may be considered which uses a 30 cm phantom with a water Iodine solution (to mimic a human body with injected contrast agent (Iodine)). This allows for the estimation of the expected detector signals and noise. A certain material decomposition may be assumed and the water and Iodine absorption estimated from these measurements. Statistical methods can be used (for example the so-called Cramer-Rao lower bound estimation) to estimate the covariance matrix of the decomposition results. The variance of the water signals may be used as the cost function.

Thus, in the example above, the cost function is minimal when the image noise in the water image is smallest. The Cramer-Rao lower bound enables estimation of this noise from the signal characteristics of the projection data.

It is noted that other dose definitions than the total beam energy per radiated unit of mass (Kerma) may alternatively be used in further embodiments.

For example, the skin dose may be estimated as a component of P( ) (discussed above) which is absorbed in the patient skin. The central dose absorbed in the body center may alternatively be estimated. A weighted sum of the patient and body dose could be used in some examples. In each case, a similar methodology as outlined above for the total beam energy per radiated unit of mass definition of dose can be used.

If a definition of dose is used corresponding to a deeper level of the body than the skin, equations (1)-(3) can be straightforwardly adjusted by simply adjusting f in equation (1) to define all the material layers between the X-Ray source and the target depth level. It may thus be adjusted to include the layers of tissue between the skin surface and the target level (e.g. center of the body). The remainder of the dose calculation can remain the same. By way of non-limiting example, an approximate adjustment can be made for the central dose by adding the equivalent of 15 cm water attenuation (for an approximately 30 cm diameter patient).

Instead of calculating the dose, it is also possible obtain the dose values in advance from experiments. For example, the dose can be measured or determined in advance for different constant kVp values, and recorded in a lookup table. During operation of the CT apparatus, the dose for a particular kVp can be determined simply by using the lookup table.

As discussed above, in accordance with one or more embodiments, the controller 120 or a reconstructor 116 may generate virtual non-spectral image data based on the obtained spectral projection data. Additionally or alternatively, spectral image data may be obtained from the spectral projection data.

Figures 5, 6:
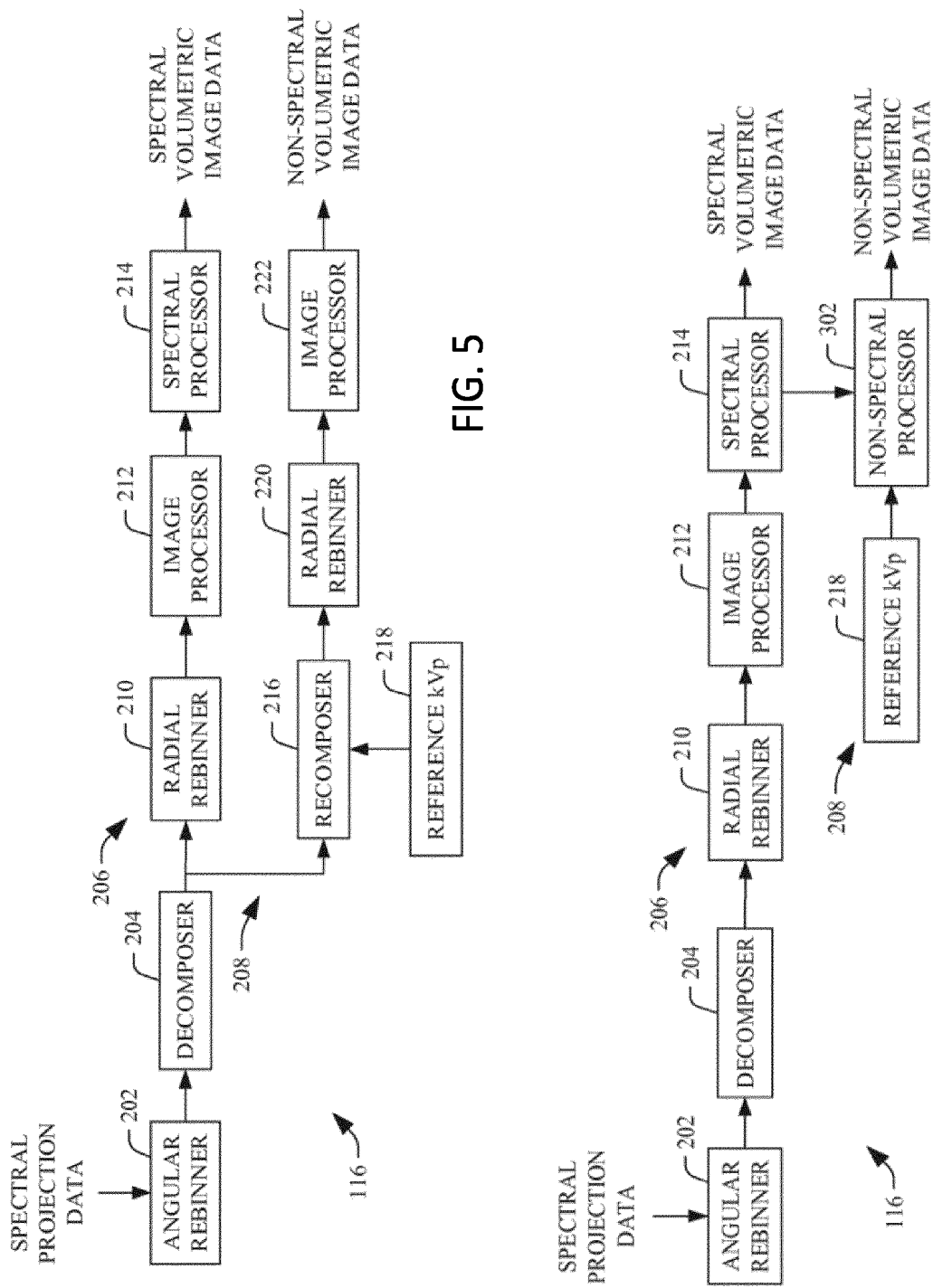
FIG. 5 shows an example method for reconstructing non-spectral and spectral imaging data from acquired spectral projection data for forming a virtual non-spectral image.
FIG. 6 shows a further example method for reconstructing non-spectral and spectral imaging data from acquired spectral projection data for forming a virtual non-spectral image.

An example method for reconstructing spectral and virtual non-spectral image data from the spectral projection data will now be outlined with reference to FIG. 5 and FIG. 6.

FIG. 5 schematically illustrates an example of the reconstructor 116 in accordance with one or more embodiments. For explanatory purposes, this example is described in connection with a dual energy scan in which the voltage of the radiation source 108 is switched between two voltages (lower and higher) between views, and the detector 112 generates low and high kV projection data.

An angular rebinner 202 receives the sets of low and high kV spectral projection data and angularly rebins them to produce sets of low and high kV parallel line integrals. In one non-limiting instance, this is achieved through a known or other angular rebinning approach. An example of a suitable approach is described in U.S. Pat. No. 6,963,631 B2.

A decomposer 204 decomposes the sets of low and high kV parallel line integrals into different basis or contributions such as photo-electric effect and Compton scattering or other bases. A non-limiting approach includes creating a look-up table (LUT) with contribution of each basis as a function of energy, storing the LUT, and using the values in the LUT to decompose the line integrals into contributions of the two bases. An example of a suitable approach for creating and using the LUT for decomposition is described in U.S. Pat. No. 9,324,142 B2.

Another approach models low and high kV parallel line integrals as: $I_{h,l} = \int S_{h,l}(E)D(E)\exp(-\int \mu(E)dl)dE$, where indices h, l refer to high and low, $S_{h,l}(E)$ is the tube spectrum for high and low, and $\exp(-\int \mu(E)dl)dE$ represents the line integrals. Dual energy processing separates $\mu(E)dl$ into basis components so that, e.g., $I_{h,l} = \int S_{h,l}(E)D(E)\exp(-L_{B1}B1(E)-L_{B2}B2(E))dE$, where $L_{B1}$ and $L_{B2}$ are two basis pair contributions, D(E) represents the spectral response of the detector, and B1(E) and B2(E) are their corresponding energy dependencies of attenuation. The decomposition solves for each pixel a non-linear system that maps the two unknowns $L_{B1}$ and $L_{B2}$ to the measurements $I_h$ and $I_l$.

Where the two basis pair contributions are photo-electric effect and Compton scattering contributions, $I_{h,l} = \int S_{h,l}(E)D(E)\exp(-L_pP(E)-L_sS(E))dE$, where $L_p$ and $L_s$ are the photo-electric effect and Compton scattering contributions, and P(E) and S(E) are their corresponding energy dependencies of attenuation, and the decomposition solves for each pixel a non-linear system that maps the two unknowns $L_p$ and $L_s$ to the measurements $I_h$ and $I_l$. Other basis pairs are also contemplated herein. Another example is described in Alverez, et al, "Energy-selective Reconstructions in X-ray Computerized Tomography," Phys. Med. Biol. 1976, Vol. 21, No. 5, 733-744. Other approaches are also contemplated herein.

The reconstructor 116 includes two processing chains, 206 and 208, which process both contributions. The processing (spectral) chain 206 processes the contributions and generates spectral volumetric image data. The processing (non-spectral) chain 208 processes the contributions and generates non-spectral volumetric image data.

The processing chain 206 includes a radial rebinner 210 that receives the two contributions and radially rebins (e.g., through interpolation) the parallel line integrals to produce equally spaced parallel line integrals. In one non-limiting instance, this is achieved through a known or other angular rebinning approach. An example of a suitable approach is described for example in U.S. Pat. No. 6,963,631 B2.

The processing chain 206 further includes an image processor 212 that reconstructs the radially rebinned decomposed projection data, producing first and second volumetric image data for the first and second contributions. The image processor 212 employs a filtered back-projection, iterative, and/or other reconstruction approach.

The processing chain 206 further includes a spectral processor 214 that combines (e.g., with a weighted summation) the first and second volumetric image data to produce spectral volumetric image data. For example, the image processor 212 can produce mono-energetic volumetric image data. As described herein, other spectral volumetric image data includes, by way of non-limiting example, virtual non-contrast, effective Z, or iodine only spectral volumetric image data. Mono-energetic images are images that would be acquired with an X-ray source that emits photons with only a single energy.

The processing chain 208 includes a recomposer 216 that recomposes the decomposed projection data for a predetermined reference tube voltage 218. The predetermined reference tube voltage 218 is taken as the user-specified value of the fixed radiation source voltage (input as one of the second operating parameters), kVp.

An example recomposition is: $I_{user\_kVp} = \int D(E)S_{user\_kVp}(E)\exp(-L_pP(E)-L_sS(E))dE$, where $S_{user\_kVp}(E)$ is the tube spectrum for the user-specified value of the fixed tube voltage. For example, where the low and high kVp values are 80 kVp and 140 kVp, and the user-specified fixed tube voltage value 218 is 120 kVp, the recomposition is: $I_{120\_kVp} = \int D(E)S_{120\_kVp}(E)\exp(-L_pP(E)-L_sS(E))dE$. In one instance, this is implemented by multiplying the attenuation of a material at a particular energy by the portion of the energy spectrum at that particular energy for the user-specified tube voltage 218, for all energies of the energy spectrum, and then summing the products.

The processing chain 208 further includes a radial rebinner 220 that receives the recomposed projection data and radially rebins the parallel line integrals to produce equally spaced parallel line integrals, e.g., as discussed in connection with the radial rebinner 210. In one instance, the radial rebinners 210 and 220 are separate radial rebinners, as shown. In a variation, the radial rebinners 210 and 220 are part of a same radial rebinner or are the same radial rebinner.

The processing chain 208 further includes an image processor 222 that receives the radially rebinned recomposed projection data and reconstructs the data, e.g., as discussed in connection with the image processor 212. In one instance, the image processors 212 and 222 are separate image processors, as shown. In a variation, the image processors 212 and 222 are part of a same image processor or are the same image processor.

Generally, the processing chain 208 processes interleaved acquisitions taken at different source spectrums and generates non-spectral volumetric image data that looks like non-spectral volumetric image data reconstructed with projection data from a particular kVp acquisition. By way of example, in one non-limiting instance the processing chain 208 processes 80 kVp and 140 kVp interleaved acquisitions and generates volumetric image data that looks like non-spectral volumetric image data reconstructed with projection data from a single 120 kVp acquisition.

It is noted that in different embodiments, or in different reconstruction modes, the reconstructor can be configured to generate only the non-spectral image data, only the spectral image data, or both the spectral and non-spectral image data. Thus in accordance with one set of embodiments, the radial rebinner 210, the image processor 212 and the spectral processor 214 of the first processing chain 206 may be omitted, so that only non-spectral volumetric image data is constructed from the spectral projection data. In further embodiments, the whole of the second processing chain 208 may be omitted so that only spectral volumetric image data is generated. In further embodiments, both processing chains 206, 208 are implemented so that both spectral and non-spectral image data is generated.

FIG. 6 schematically illustrates another example of the reconstructor 116. This example includes the angular rebinner 202, the decomposer 204 and the whole of the first processing chain 206 of the example of FIG. 5 (including the radial rebinner 210, and the image processor 212, and the spectral processor 214). These components are discussed above, and the discussion in not repeated here. In this example, the spectral processor 214 generates spectral image data in the form of mono-energetic images across an energy spectrum of the radiation beam, e.g., from 40 keV to 120 keV.

In this example, the second processing chain 208 includes the reference kVp (the user-specified value for the fixed tube voltage) 218 (described above) and a non-spectral processor 302. The non-spectral processor 302 generates non spectral volumetric image data by calculating a weighted average of mono-energetic images across the radiation beam energy spectrum (e.g., from 40 keV to 120 keV), where the relative weight is derived from the effective tube spectrum at the user-specified tube voltage (e.g., 120 kVp) filtered by the subject or an average subject. This weighting will mimic the contrast shown in non-spectral volumetric image data.

As discussed above, embodiments make use of a controller. The controller can be implemented in numerous ways, with software and/or hardware, to perform the various functions required. A processor is one example of a controller which employs one or more microprocessors that may be programmed using software (e.g., microcode) to perform the required functions. A controller may however be implemented with or without employing a processor, and also may be implemented as a combination of dedicated hardware to perform some functions and a processor (e.g., one or more programmed microprocessors and associated circuitry) to perform other functions.

Examples of controller components that may be employed in various embodiments of the present disclosure include, but are not limited to, conventional microprocessors, application specific integrated circuits (ASICs), and field-programmable gate arrays (FPGAs).

In various implementations, a processor or controller may be associated with one or more storage media such as volatile and non-volatile computer memory such as RAM, PROM, EPROM, and EEPROM. The storage media may be encoded with one or more programs that, when executed on one or more processors and/or controllers, perform the required functions. Various storage media may be fixed within a processor or controller or may be transportable, such that the one or more programs stored thereon can be loaded into a processor or controller.

Variations to the disclosed embodiments can be understood and effected by those skilled in the art in practicing the claimed invention, from a study of the drawings, the disclosure and the appended claims. In the claims, the word "comprising" does not exclude other elements or steps, and the indefinite article "a" or "an" does not exclude a plurality.

A single processor or other unit may fulfill the functions of several items recited in the claims.

The mere fact that certain measures are recited in mutually different dependent claims does not indicate that a combination of these measures cannot be used to advantage.

A computer program may be stored/distributed on a suitable medium, such as an optical storage medium or a solid-state medium supplied together with or as part of other hardware, but may also be distributed in other forms, such as via the Internet or other wired or wireless telecommunication systems.

If the term "adapted to" is used in the claims or description, it is noted the term "adapted to" is intended to be equivalent to the term "configured to".

Any reference signs in the claims should not be construed as limiting the scope.

The invention claimed is:

1. A system, comprising:
   a spectral computed tomography (CT) imaging apparatus comprising an X-ray generator having at least one X-ray tube, the X-ray generator being controlled during operation to switch cyclically between an upper tube voltage and a lower tube voltage of a kVp switching protocol, wherein the imaging apparatus is configured to generate spectral CT scan data and to have a set of adjustable first operating parameters; and
   a controller, operatively coupled with the imaging apparatus, wherein the imaging apparatus is selectively operable in a secondary acquisition mode in which the controller is configured to:
   receive a user input indicative of user-defined settings for a set of second operating parameters, wherein the set of second operating parameters is associated with a different non-spectral CT imaging apparatus configured to operate with a radiation source operated with a fixed tube voltage, the set of second operating parameters including the fixed tube voltage and a tube current;
   apply a conversion procedure, which includes adjusting the upper tube voltage and the lower tube voltage of the kVp switching protocol, for converting the user-defined settings for the set of second operating parameters into a set of values for the set of first operating parameters which result in delivery of a same X-ray radiation dose over a single kVp switching cycle period as would be delivered by a fixed-voltage radiation source, operated with the user-defined settings for the set of second operating parameters over the same time period; and
   generate control instructions for causing the imaging apparatus to perform a CT scanning procedure in accordance with the set of values for the set of first operating parameters to obtain the spectral CT scan data.

2. The system as claimed in claim 1, wherein the controller is configured to generate virtual non-spectral image data based on processing of the obtained spectral CT scan data and based on the fixed tube voltage.

3. The system as claimed in claim 1, wherein the controller is configured to:
   determine a time period of a single kVp switching cycle of the spectral CT apparatus;
   calculate an estimated X-ray dose which would be delivered by a fixed-voltage radiation source, operated with the user-defined settings for the second operating parameters over the time period; and
   determine settings for the set of first operating parameters which, when implemented on the spectral CT scanning apparatus, are estimated to result in delivery of an X-ray dose over each switching cycle period equal to the estimated X-ray dose.

4. The system as claimed in claim 3, wherein the controller is further configured to provide a fitting procedure for fitting the set of first operating parameters based on a target X-ray dose equal to the computed X-ray dose for the fixed voltage radiation source.

5. The system as claimed in claim 1, wherein the X-ray dose is defined as a total beam energy per radiated unit of mass.

6. The system as claimed in claim 5, wherein the controller is configured to calculate the total beam energy per radiated unit of mass for the fixed-voltage radiation source based on the equation:

$$K_{conv}=T\!\int_0^\infty dE P(E,U_{conv},I_{conv})E$$

where P(E, U, I) is the estimated spectrum of a beam of the fixed-voltage radiation source entering the scanned subject, where E is the radiation energy, U is the fixed tube voltage, I is the tube current, and T is the time duration of a single kVp-switching cycle of the spectral imaging apparatus.

7. The system as claimed in claim 6, wherein the controller is configured to calculate the spectrum of the beam that enters the subject based on the equation:

$$P(E,U,I)=X(E,U,I)e^{-\Sigma_{i\in f}\mu(i,E)l(i)}$$

where X(E, U, I) is an assumed X-ray tube output spectrum, f is the estimated set of all materials the beam must pass through between the fixed voltage radiation source and the subject, μ(i,E) is the linear absorption coefficient of material i, l(i) is the thickness of each material, E is the radiation energy, U is the fixed tube voltage, and/is the X ray-tube current.

8. The system as claimed in claim 1, further operable, in at least one operation mode, to generate spectral image data based on spectral projection data.

9. The system as claimed in claim 1, wherein the controller is configured to receive a user input indicative of a desired image reconstruction mode, and based on the user input, to selectively operate:
   in a first reconstruction mode in which only virtual non-spectral image data is generated;
   in a second reconstruction mode in which both the virtual non-spectral image data and spectral image data is generated; or
   in a third reconstruction mode in which only the spectral image data is generated.

10. The system as claimed in claim 1, further comprising a user interface operatively coupled with the controller, the controller being arranged to receive the user-defined settings for the set of second operating parameters from the user interface.

11. The system as claimed in claim 1, further comprising a display-, and wherein the controller is configured to reconstruct volumetric image data based on the spectral CT image data and to output the volumetric image data to the display.

12. A method of controlling a spectral computed tomography (CT) operation, comprising:
   providing a kVp-switching apparatus comprising an X-ray generator having at least one X-ray tube, the X-ray generator being controlled during operation to switch cyclically between an upper tube voltage and a lower tube voltage of a kVp switching protocol, wherein the apparatus is configured to generate spectral CT scan data and to have a set of adjustable first operating parameters;
   receiving a user input indicative of user-defined settings for a set of second operating parameters, wherein the set of second operating parameters is associated with a different non-spectral CT imaging apparatus configured to operate with a radiation source operated with a fixed tube voltage, the set of second operating parameters including at least the fixed tube voltage and a tube current;
   applying a conversion procedure, which includes adjusting the upper tube voltage and the lower tube voltage of the kVp switching protocol, for converting the user-defined settings for the set of second operating parameters into a set of values for the set of first operating parameters which result in delivery of a same X-ray radiation dose over a single kVp switching cycle period as would be delivered by a fixed-voltage radiation source operated with the user-defined settings for the set of second operating parameters over the same time period; and
   generating control instructions for causing the X-ray imaging apparatus to perform a CT scanning procedure in accordance with the set of values for the set of first operating parameters to obtain the spectral CT scan data.

* * * * *